United States Patent [19]
Hall

[11] 3,805,740
[45] Apr. 23, 1974

[54] AQUARIUM AND COVER
[75] Inventor: Frank Kenneth Hall, Saginaw, Mich.
[73] Assignee: O'Dell Manufacturing, Inc., Saginaw, Mich.
[22] Filed: Nov. 1, 1972
[21] Appl. No.: 302,919

[52] U.S. Cl. .................................................. 119/5
[51] Int. Cl. ........................................... A01k 64/00
[58] Field of Search ...................... 119/5; 240/2 LC

[56] References Cited
UNITED STATES PATENTS
2,776,642  1/1957  Sepersky ................................ 119/5
3,125,065  3/1964  Willinger ............................... 119/5
FOREIGN PATENTS OR APPLICATIONS
1,185,420  3/1970  Great Britain ......................... 119/5

Primary Examiner—Louis G. Mancene
Assistant Examiner—James A. Oliff
Attorney, Agent, or Firm—Learman & McCulloch

[57] ABSTRACT

An aquarium, having an upper access opening, and a cover for the opening including a light reflecting hood which mounts an aquarium illuminating lamp and overlies the opening. The cover includes a housing overlying and sealed to the hood and portions of the hood and housing are spaced to define a moisture-free enclosure for receiving electrical components which are connected in circuit with the lamp. One side of the hood, maybe sealed to one side of the housing by means of a separate locking strip having recesses which receive portions of both the hood and the housing.

14 Claims, 4 Drawing Figures

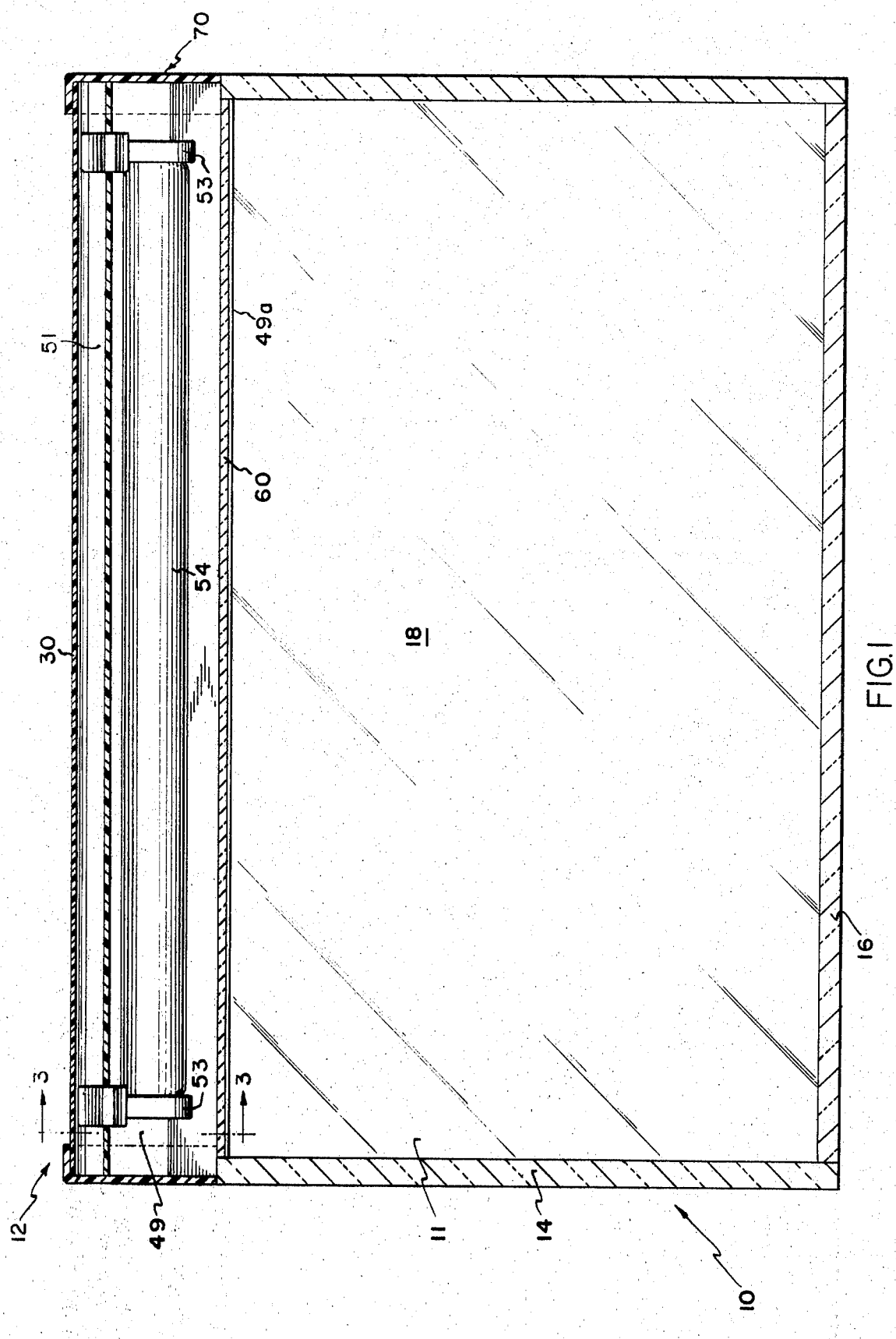

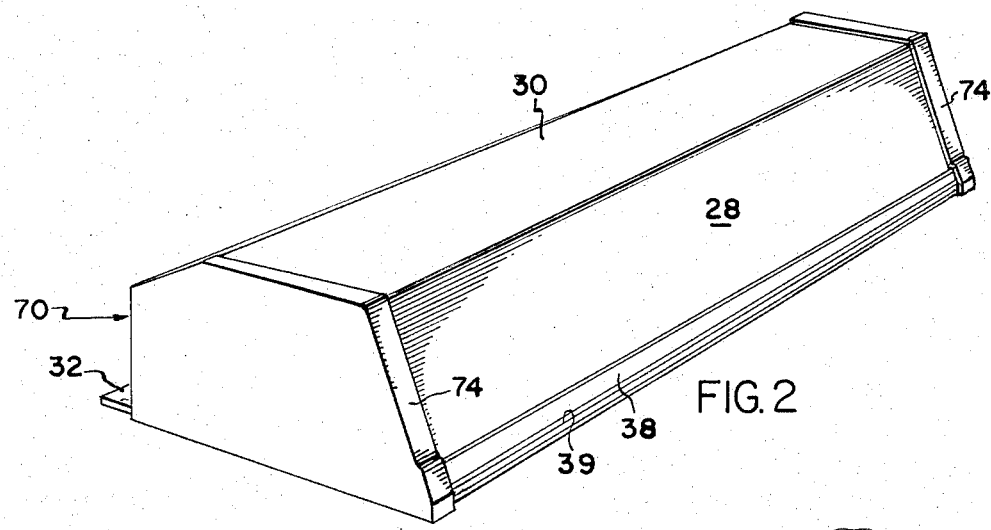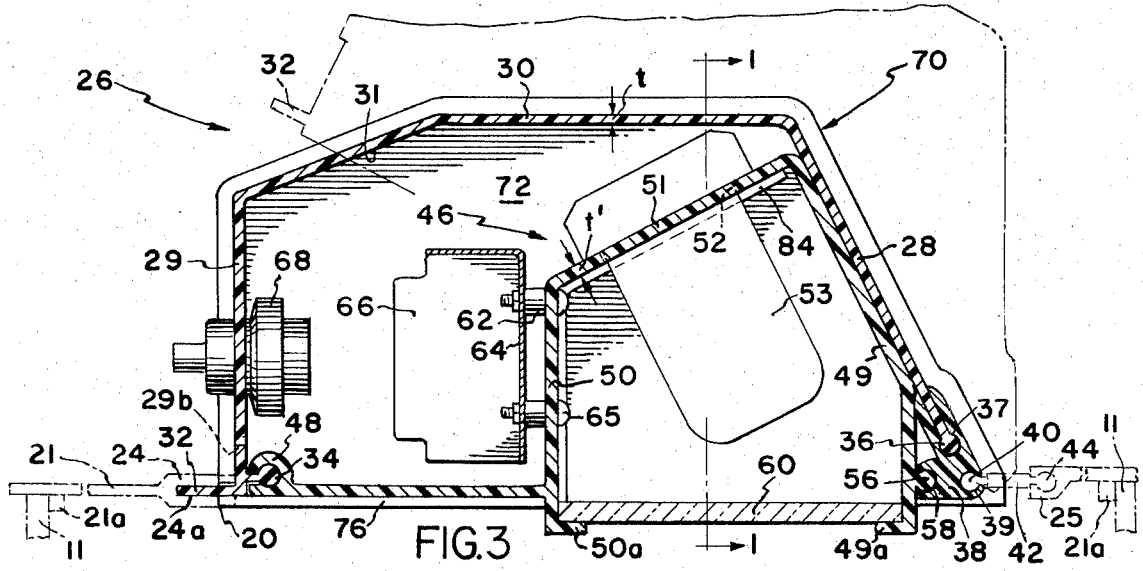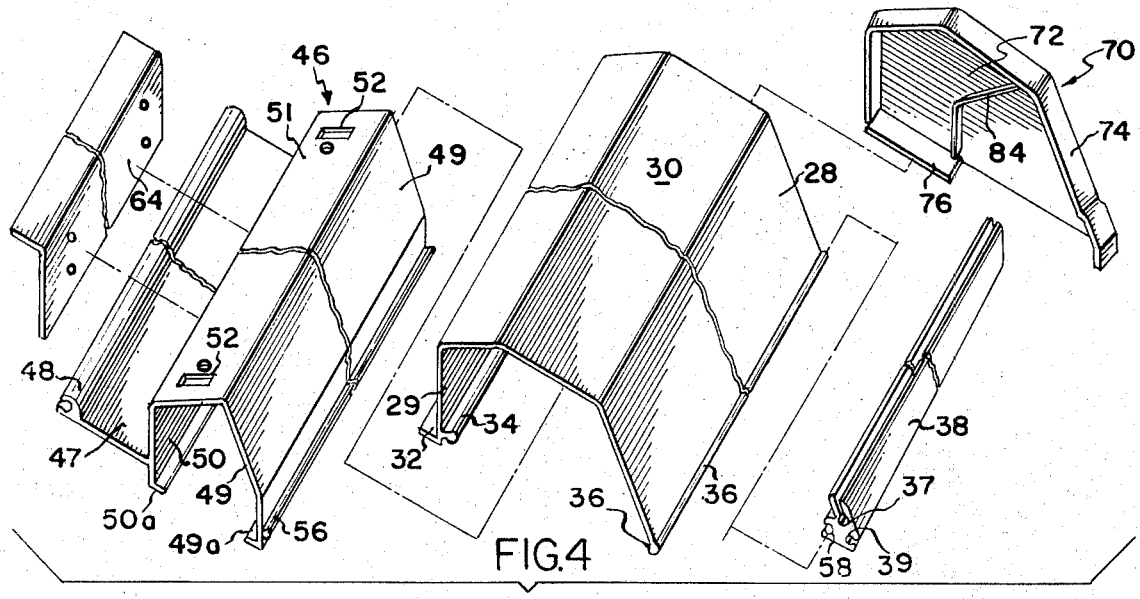

3,805,740

AQUARIUM AND COVER

BACKGROUND OF THE INVENTION

This invention relates to an aquarium and a cover therefor, and more particularly to an easily assembled aquarium cover having a sealed compartment for electrical components which are connected in circuit with electrically powered aquarium accessories.

Aquarium covers conventionally mount lamps for illuminating an aquarium, electrical components for operating the lamps, and other electrically operated equipment for operating pumps, aerators, and other similar aquarium accessories. These electrically operable components in many commercially available aquariums are disposed immediately above the aquarium and any water vapor rising from the aquarium will tend to condense on the electrical components, precipitating corrosion. The corrosion is accelerated when the aquarium contains salt water. Accordingly, it is an object of the present invention to provide an aquarium hood which includes a sealed, electrical component receiving, enclosure that will isolate such electrical components from water vapor rising from the heated water in the tank.

An aquarium cover constructed according to the present invention includes a light reflecting hood which mounts a lamp on the underside thereof. Electrical components for operating the lamp are mounted on the upper side of the hood. The cover includes a housing overlying the components and the lamp mounting hood. The underside of the lamp mounting hood is of light color to enhance reflection of the light emanating from the lamp whereas the housing is generally darker in color for aesthetic purposes. The hood is thicker than the housing because it must withstand the weight of the lamp and other electrical components mounted thereon, as well as the heat of the lamp. The hood and housing, which are formed of different thickness and different color, extruded synthetic plastic material, such as rigid vinyl, usually must be separately extruded. The lamp mounting hood is thereafter sealably attached to the housing to provide a substantially sealed enclosure for the electrical components. The sealing on one side is accomplished via a separate locking strip which includes elongate sockets receiving a portion of one side of the hood and a confronting part of the housing and on the other side is accomplished by a similar direct connection.

It is an object of the present invention to provide an attractive aquarium cover including a light-color, extruded, synthetic plastic, lamp mounting hood, and a darker color, extruded synthetic plastic housing overlying the lamp mounting hood, and sealed thereto.

When the hood and housing are sealed, the free flow of air, which would otherwise aid in dissipating the heat emanating from the electrical components, is impeded. If the electrical components and the plastic cover and hood are heated so as to exceed a predetermined temperature, they may be permanently damaged and constitute a fire hazard. To prevent an excessive build-up of heat in the area immediately surrounding the electrical components, it is desirable to disperse the concentrated heat throughout the enclosure. Accordingly, it is still another object of the present invention to provide an aquarium cover of the type described which will dissipate the heat throughout the component receiving chamber.

It is another object of the present invention to provide an aquarium cover of the type described including an electrical component mounting, heat conducting plate which is spaced from the hood and housing and dissipates the heat generated by the electrical component or components throughout an extended portion of the enclosure.

Other objects and advantages of the present invention will become apparent to one of ordinary skill in the art by the following description when considered in relation to the accompanying drawings, in which:

FIG. 1 is a sectional side elevational view of an aquarium and cover constructed according to the present invention;

FIG. 2 is a slightly reduced, side perspective view of the aquarium cover illustrated in FIG. 1;

FIG. 3 is a sectional end view, taken along the line 3—3 of FIG. 1; and

FIG. 4 is an exploded, slightly further reduced, perspective view illustrating selected components of the aquarium cover.

DESCRIPTION OF THE PREFERRED EMBODIMENT

Apparatus constructed according to the present invention comprises an aquarium, generally designated 10, and a cover, generally designated 12. The aquarium 10 may be constructed identically to the aquarium disclosed in the present assignee's copending U.S. Pat. application, Ser. No. 209,101, filed in the United States Patent Office on Dec. 17, 1971, now United States Patent No. 3,759,224 granted September 18, 1973 and incorporated herein by reference. The aquarium 10 may also be constructed as shown in FIGS. 1 and 3 to include transparent side walls 11, spanned by transparent end walls 14, and a transparent bottom wall 16. The walls 11, 14 and 16 cooperate, as usual, to define a water-receiving well or reservoir 18.

Shown spanning the aquarium side walls 11 and 14 in FIG. 3, is a top wall 21 (FIG. 3), having a perimetrical, retaining flange 21a engaging the interior surfaces of the side and end walls 11 and 14, and also having an access opening 20 therein. The top wall 21 includes an elongate, bifurcated latch part 24, having a recess 24a bounding one side of the opening 20, and a socket providing portion 25, having an elongate socket 25a bounding the opposite side of the opening 20, for a purpose to become apparent hereinafter. The top wall 21 may be extruded from suitable synthetic plastic thermoplastic material.

The aquarium cover 12 includes a downwardly opening, open-ended, inverted trough-like housing, generally designated 26 (FIG. 3), extruded from dark-colored, synthetic plastic, thermoplastic material having a substantially uniform wall thickness $t$ (FIG. 3). The housing 26 includes generally upstanding front and rear side walls 28 and 29 spanned by a top wall 30 to define a downwardly opening compartment 31. The rear housing wall 29 is formed with an elongate locking flange 32, received in the recess 24a of the bifurcated part 24, and an oppositely disposed elongate locking bead 34 for a purpose to be later described.

The front housing wall 28 of the housing 26 is extruded with an elongate locking bead 36 received, with a slide-fit, in a recess 37 provided in an enlarged locking and sealing strip 38 extruded from synthetic plastic, thermoplastic material. The increased thickness locking strip 38 is also provided with a recess 39 receiving, with either a slide or snap-fit, an elongate bead 40 provided on a flexible, plastic hinge 42 which also includes an elongate bead 44 received with a snap-fit, in the socket 25a provided in the top wall 21. When the cover locking flange 32 on the housing 26 is removed from the latch 24, the housing 26 is swingable about the hinge 42, from a position overlying the opening 20 and illustrated in solid lines in FIG. 3, to a raised position, illustrated in chain lines in FIG. 3, to provide access to the opening 20 in the upper wall 21 of the aquarium.

Mounted in the chamber 31 in the downwardly opening, trough-like housing member 26 is a lamp mounting, light reflecting hood, generally designated 46, which is extruded from white, synthetic plastic, thermoplastic material. The lamp mounting hood 46 is generally coextensive with and underlies the housing 26, and has a substantially uniform wall thickness $t'$ which, as shown in FIG. 3, is of greater thickness than the housing 26. The lamp mounting hood 46 includes a laterally offset lower wall portion 47 having an elongate, socket defining member 48 which is snapped over the elongate bead 34 on the housing 26 to seal the rear wall 29 of the housing 26 to the lower wall 47 of the lamp mounting hood 46. The snap-fit permits the housing 26 to be separated from the lamp mounting hood 46 to provide access to the housing chamber 31. The bead 34 and socket 48 extend the full length of the hood 46 and housing 26 which lap the aquarium end walls 14.

The lamp mounting hood 46 includes generally upstanding, front and rear side wall portions 49 and 50 spanned by an upper wall 51 which has a pair of longitudinally spaced apertures 52 receiving a pair of lamp sockets 53 that mount an elongate, fluorescent lamp bulb 54 (FIG. 1) of conventional construction. The front wall 49 of the hood 46 includes an elongate bead 56 which is received, with a slide-fit, in a socket 58 provided in the elongate locking strip 38 to seal the front housing wall 28 to the front hood wall 49 and prevent the passage of water vapor therebetween. The front and rear hood walls 49 and 50 include a pair of opposed, elongate flanges 49a and 50a for supporting a light transmitting glass panel 60. The beads 36 and 56 and sockets 37 and 58 extend the full length of the hood 46, as does locking strip 38.

Supported on the rear side wall 50 of the lamp mounting hood 46, by nylon nut and bolt assemblies 65, is a heat transferring, plate 64 mounting a high-leakage reactance transformer, generally designated 66, which is connected to the light sockets 53 by wires (not shown). The metal plate 64, which may suitably comprise a highly heat conductive material such as aluminum, helps to keep too much heat from building around the transformer 66 by conducting and dissipating the heat generated by the transformer over a wide area. The plate 64 is spaced from the rear hood wall 50 by insulated spacer members 62 to minimize the heat transmitted to the plastic hood wall 50. The transformer and heat transferring plate 64 are spaced at least three-eighths inch from any portion of the lamp mounting hood 46 or housing 26 to prevent excessive heat transfer to any one portion of the hood 46 or housing 26. The plate 64 conducts the transformer heat away from the transformer 66 so that the transformer operates below 90° C, which is the maximum safe operating temperature approved by Underwriter's Laboratory. If the heat transfer plate is not utilized, the useful life of the ballast transformer 66 is greatly reduced.

The transformer 66 is used to provide high voltage to the lamp 54, during starting, and functions to limit the current flow during operation of the lamp 54. Wires (not shown) connect the transformer 66 to an electrical switch 68, which may be an on-off switch, fixed to the side wall 28 of the housing 26. The switch 68 is connected to a suitable source of electrical power such as 60 hertz, 110 volt, alternating current by wires (not shown), passing through an opening 29b, provided in the rear housing wall 29, for electrically energizing the lamp 54.

The coterminal ends of the lamp mounting hood 46 and the housing 26 are sealed by a pair of synthetic plastic end caps, generally designated 70, each including an end wall 72 and an inwardly directed flange 74 sealed to the side and top walls 29 and 30 of the outer housing 26. The end caps 70, which also enclose locking strip 38, each include a lower flange 76 which underlies the lower wall portion 47 of the lamp mounting hood 46. A hood support flange 84 is also provided on the inside of the end cap wall 72 for supporting the top wall 51 of the lamp mounting hood 46. A bead of sealing cement, such as a silicone sealant, for example, the water impervious, adhesive sealant manufactured by General Electric Company and sold under the trade designation "RTV-108," is placed around the inside surface of the end cap flanges 74 and 76 to seal the caps to the housing 26 and lamp mounting hood 46.

THE METHOD OF MAKING THE COVER

The cover 12 is fabricated by firstly extruding synthetic plastic, thermoplastic material to form the lamp mounting hood 46, the housing 26, the locking strip 38, and the hinge 42. Since the housing 26 and the lamp mounting hood 46 are of different colors and thicknesses, they normally are separately extruded. The lamp mounting sockets 53 are then inserted into the apertures 52 provided in the top wall 51 of the lamp mounting hood 26 and the transformer, generally designated 66, is mounted on the heat absorbing plate 64, which is fastened to the side wall portion 50 of the lamp mounting hood 46. The lamp sockets 53 are then connected in circuit with the transformer 66 by wires (not shown). The on/off switch 68 is thereafter mounted on the housing side wall 29 and is connected in circuit with the transformer 66 by wires (not shown).

The housing 26 is then placed over the lamp mounting hood 46 and the socket defining portion 48 on the lower wall portion 47 of the lamp mounting hood 46 is snapped over the elongate bead 34 on the rear housing side wall 29 to seal the housing side wall 29 of the housing 26 to the bottom hood wall 47. The locking strip 38 is then simultaneously longitudinally slipped or slid endwisely onto and along the bead 56 of the lamp mounting hood 46 and the confronting bead 36 of the housing 26 so that the front wall 28 of the housing 26 is sealed to the front wall 49 of the hood 46. The flexible hinge 42 is then slid endwisely on and along the recess 39 of the enlarged strip 38. Finally, the ends of the housings 26 and 46 can be sealed by the adhesive bearing end caps 70.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. In combination
an aquarium tank including closure wall means having side and bottom closure wall portions defining a liquid receiving well, and an upper access opening;
apparatus for covering said access opening comprising:
a lamp mounting, light reflecting hood overlying said access opening;
an electrically energizable lamp mounted on the underside of said light reflecting hood for illuminating said tank when said lamp is electrically energized;
a housing overlying said hood, portions of said hood and housing being spaced to define a chamber;
electrically operable component means, mounted on one of said light reflecting hood and said housing, received in said chamber, said component means being electrically connected to said lamp and adapted to be connected to a source of electrical power for energizing said lamp;
said lamp mounting hood and said housing being formed of synthetic plastic, thermoplastic material; and
liquid vapor sealing means for sealing said hood to said housing, including a separate elongate sealing strip having socket means for receiving portions of said hood and said housing, to isolate said electrically operable component means from any liquid vapor rising from said aquarium tank.

2. The combination set forth in claim 1 wherein said housing comprises side and top wall means defining said chamber which is downwardly opening to receive said electrical component means and said hood; said hood including wall means having side and top wall portions defining a downwardly opening lamp receiving chamber; said hood and said housing being substantially flush with the top of the tank.

3. The combination set forth in claim 2 wherein said sealing means comprises cooperating elongate bead means on one of said hood and housing, and elongate socket means on the other of said hood and housing for receiving said bead means.

4. The combination set forth in claim 1 wherein the sides of said hood and housing are in confronting relation; said sealing strip seals one side of said hood to a confronting side of said housing; said sealing means further including means for sealing the other side of said hood and the confronting side of said housing, comprising: elongate bead means on one of said hood and housing, and socket means on the other of said hood and housing separably receiving said bead means to permit said housing to be separated from said hood and swung upwardly relative to said hood to provide access to said electrical component means.

5. The combination set forth in claim 1 including elongate, heat conducting means spaced from said hood and said housing and extending longitudinally away from said component means in said chamber for conducting the heat emanating from said component means away from said component means and dissipating it throughout said chamber to prevent an excessive build-up of heat immediately surrounding said component means.

6. The combination set forth in claim 1 wherein said one of said hood and housing has a greater predetermined thickness than said other of said hood and housing.

7. In combination
an aquarium tank including closure wall means having side and bottom closure wall portions defining a liquid receiving well, and an upper access opening;
apparatus for covering said access opening comprising:
a lamp mounting, light reflecting hood overlying said access opening;
an electrically energizable lamp mounted on the underside of said light reflecting hood for illuminating said tank when said lamp is electrically energized;
a housing overlying said hood, portions of said hood and housing being spaced to define a chamber;
electrically operable component means supported by one of said light reflecting hood and said housing, at least partly received in said chamber, said component means being electrically connected to said lamp and adapted to be connected to a source of electrical power for energizing said lamp,
liquid vapor sealing means for sealing said hood to said housing to isolate said electrically operable component means from any liquid vapor rising from said aquarium tank; and
elongate, heat conducting means spaced from said hood and said housing and extending longitudinally away from said component means in said chamber for conducting the heat emanating from said component means away from said component means and dissipating it throughout said chamber to prevent an excessive build-up of heat immediately surrounding said component means.

8. An aquarium cover for covering an upper access opening in an aquarium tank which comprises closure wall means having side and bottom closure wall portions defining a liquid receiving well, said cover comprising:
a downwardly opening housing defining a chamber, adapted to overlie said access opening;
a lamp mounting, light reflecting hood received in said chamber and dividing said chamber into a pair of horizontally side-by-side chamber sections;
an electrically operable lamp, mounted on the underside of a portion of said light reflecting hood so as to be at least partially received in one of said chamber sections, for illuminating said tank when said lamp is electrically energized;
electrically operable component means mounted on one of said light reflecting hood and said housing and received in the other of said chamber sections, said component means being electrically connected to said lamp and adapted to be connected to a source of electrical power for energizing said lamp; and
water vapor sealing means for sealing said hood to said housing, to isolate said other chamber section and said electrically operable component means from liquid vapor rising from said aquarium tank.

9. The cover as set forth in claim 8 wherein said hood is downwardly opening and includes a chamber for receiving at least a portion of said lamp.

10. In combination
an aquarium tank including closure wall means having side and bottom closure wall portions defining a liquid receiving well, and an upper access opening, said tank including elongate marginal socket means alongside said opening;
apparatus for covering said access opening comprising:
a lamp mounting, light reflecting hood overlying said access opening;
an electrically operable lamp mounted on the underside of said light reflecting hood for illuminating said tank when said lamp is electrically energized;
a housing overlying said hood, portions of said hood and housing being spaced to define a chamber;
electrically operable component means mounted on one of said light reflecting hood and said housing and received in said chamber, said component means being electrically connected to said lamp and adapted to be connected to a source of electrical power for energizing said lamp;
means for sealing said hood to said housing to isolate said electrically operable component means from any liquid vapor rising from said aquarium tank;
one of said hood and housing including additional socket means; and
elongate, flexible, hinge means pivotally mounting said cover on said aquarium including a pair of elongate beads received by said marginal socket means and said additional socket means.

11. An aquarium cover for covering an upper access opening in an aquarium tank including closure wall means having side and bottom closure wall portions defining a liquid receiving well, said cover comprising:
a lamp mounting, light reflecting hood for overlying said access opening;
an electrically energizable lamp mounted on the underside of said light reflecting hood for illuminating said tank when said lamp is electrically energized;
a housing overlying said hood, portions of said hood and housing being spaced to define a chamber;
electrically energizable component means, mounted on one of said light reflecting hood and said housing, received in said chamber, said component means being electrically connected to said lamp and adapted to be connected to a source of electrical power for energizing said lamp;
said lamp mounting hood and said housing being formed of synthetic plastic, thermoplastic material; and
liquid vapor sealing means for sealing said hood to said housing including a separate elongate sealing strip,
said hood, housing and sealing strip including cooperating bead and socket means for sealing portions of said hood and said housing to isolate said electrically operable component means from any liquid vapor rising from said aquarium tank.

12. In combination
an aquarium tank including closure wall means having side and bottom closure wall portions defining a liquid receiving well, and an upper access opening;
apparatus for covering said access opening comprising:
a downwardly opening, lamp mounting, light reflecting hood overlying said access opening and defining a lamp receiving chamber;
an electrically energizable lamp mounted on the underside of said light reflecting hood so as to be at least partially received in said chamber for illuminating said tank when said lamp is electrically energized;
a downwardly opening housing overlying said hood, portions of said hood and housing being spaced to define a second chamber which is horizontally alongside said lamp receiving chamber;
electrically operable component means, mounted on one of said light reflecting hood and said housing, received in said second chamber, said component means being electrically connected to said lamp and adapted to be connected to a source of electrical power for energizing said lamp; and
liquid vapor sealing means for sealing portions of said hood to portions of said housing to isolate said electrically operable component means from any liquid vapor rising from said aquarium tank.

13. The combination as set forth in claim 12 wherein one of said hood and housing includes opposed spaced support means for mounting light transmitting means in a position underlying said lamp.

14. An aquarium cover for covering an upper access opening in an aquarium tank including closure wall means having side and bottom closure wall portions defining a liquid receiving well, said cover comprising:
a downwardly opening, light reflecting hood, adapted to overlie said access opening, defining a lamp receiving chamber for receiving a lamp;
an electrically energizable lamp mounted on the underside of said light reflecting hood so as to be at least partly received in said chamber for illuminating said tank when said lamp is electrically energized;
a downwardly opening housing overlying said hood, portions of said hood and housing being spaced to define a second chamber which is horizontally alongside said lamp receiving chamber;
electrically operable component means mounted, on one of said light reflecting hood and said housing, received in said second chamber, said component means being electrically connected to said lamp and adapted to be connected to a source of electrical power for energizing said lamp; and
liquid vapor sealing means for sealing portions of said hood to portions of said housing to isolate said electrically operable component means from any liquid vapor rising from said aquarium tank.

* * * * *